(No Model.)
G. W. PAGETT.
SPECULUM.
No. 295,798.  Patented Mar. 25, 1884.
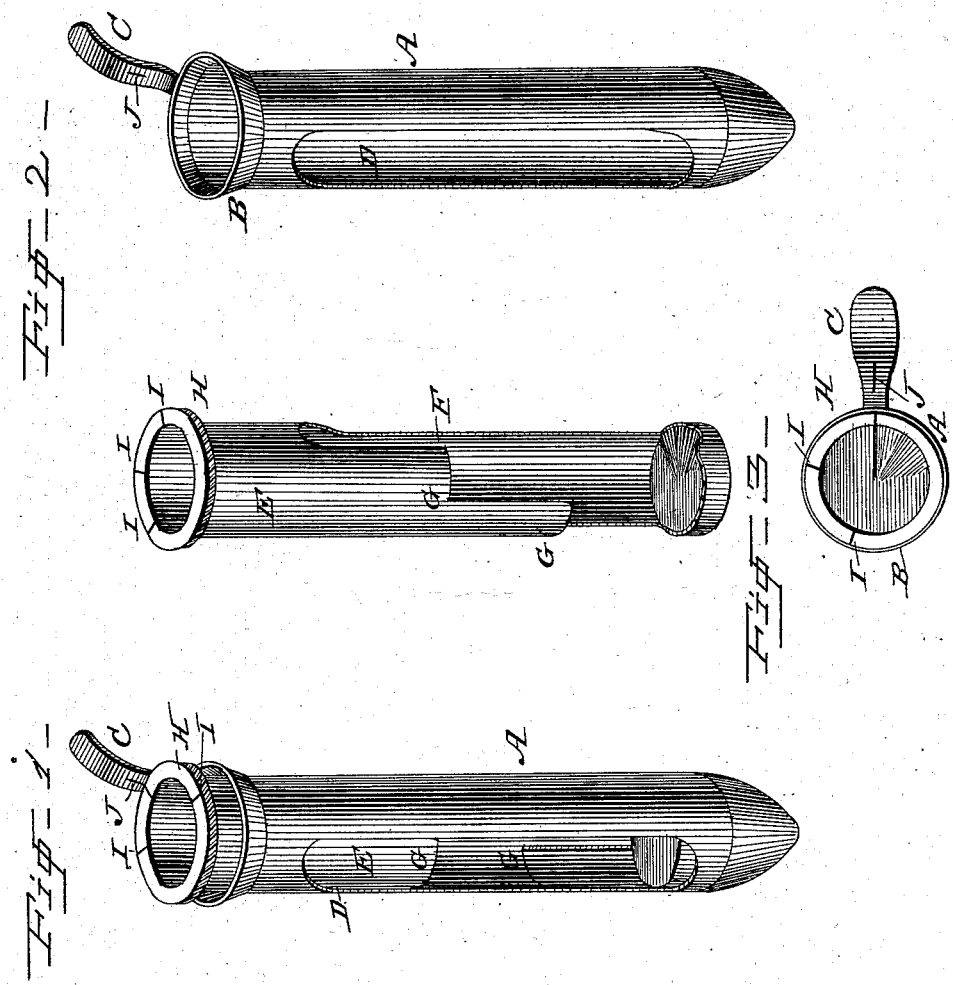
WITNESSES:
George W. Pagett,
INVENTOR.
By Louis Bagger & Co.
ATTORNEYS.

UNITED STATES PATENT OFFICE.

GEORGE W. PAGETT, OF OXFORD, INDIANA.

SPECULUM.

SPECIFICATION forming part of Letters Patent No. 295,798, dated March 25, 1884.

Application filed January 11, 1884. (No model.)

*To all whom it may concern:*

Be it known that I, GEORGE W. PAGETT, a citizen of the United States, and a resident of Oxford, in the county of Benton and State of Indiana, have invented certain new and useful Improvements in Speculums; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved speculum. Fig. 2 is a similar view of the same with its two parts separated, and Fig. 3 is an end view.

Similar letters of reference indicate corresponding parts in all the figures.

My invention has relation to rectum-specula, consisting of a cylindrical tube having a rounded inner closed end, and having a slot in its side; and it consists in the improved construction and combination of parts of such a speculum, having an inner tube fitting and turning in the outer tube, and having a slot decreasing in length by steps in its side, as hereinafter more fully described and claimed.

In the accompanying drawings, the letter A indicates the outer tube, the inner end of which is closed and rounded, while its outer end is provided with a flaring flange, B, which may be of any desired width, and with a handle, C, which is diametrically opposite to a longitudinal slot, D, in the side of the tube, through which the part to be inspected may be seen. A tube, E, fits and turns inside the outer tube, and has a longitudinal slot or opening, F, in its side, which slot decreases in length at each section of it, of the width of the slot in the outer tube, forming steps or shoulders G at the outer end of each slot-section, and the longest section of the slot is of the same length as the slot in the outer tube. The outer end of the inner tube is provided with a flange, H, which has a number of marks, I, each mark being diametrically opposite to the central line of each slot-section, and by bringing each mark in line with a mark, J, upon the handle of the outer tube, a slot-section will fit at the slot in the outer tube, allowing more or less of the slot in the said tube to be opened, and consequently allowing more or less of the surface of the rectum to be exposed when the speculum is inserted. In this manner only a portion of the rectum may be exposed to view and for treatment, as desired, which has its advantage in applying caustics or other preparations, preventing its application to a wider surface than needed and desired, as well as in operations only exposing the portion desired to treat.

The slot or opening in the inner tube may be simply cut with one edge widening out obliquely without departing from the spirit of my invention, instead of being cut off stepped, as shown in the drawings, the oblique edge exposing an increasing or decreasing surface in the same manner by turning the inner tube.

Having thus described my invention, I claim and desire to secure by Letters Patent of the United States—

1. The combination of an outer speculum-tube, having a longitudinal slot in its side, with an inner tube fitting and turning in the outer tube, and having a longitudinal slot in its side, increasing in width toward one end, as and for the purpose shown and set forth.

2. The combination of an outer speculum-tube, having a rounded closed inner end, a longitudinal slot in its side, and a suitable handle at its outer flanged end, with an inner tube fitting and turning in the outer tube, and having a longitudinal slot consisting of sections decreasing in length, each of the same width as the slot in the outer tube, as described, the outer flanged end of the inner tube and the handle upon the outer tube having marks corresponding to each other, as and for the purpose shown and set forth.

In testimony that I claim the foregoing as my own I have hereunto affixed my signature in presence of two witnesses.

GEORGE W. PAGETT.

Witnesses:
E. A. PAGETT,
JESSE S. BIRCH.